March 24, 1959   W. B. GRAHAM   2,878,489
MIXING FAUCET FITTING
Filed Feb. 27, 1958
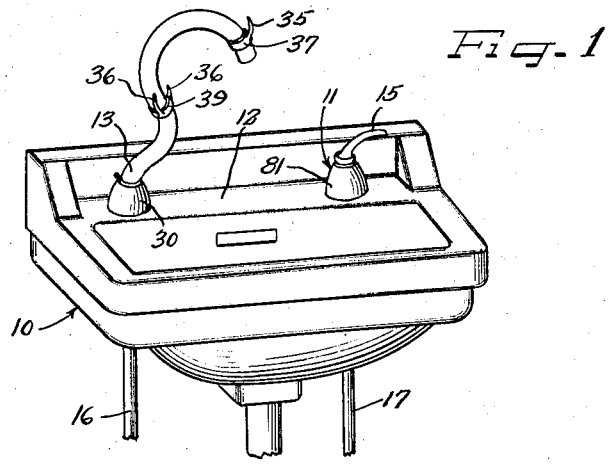
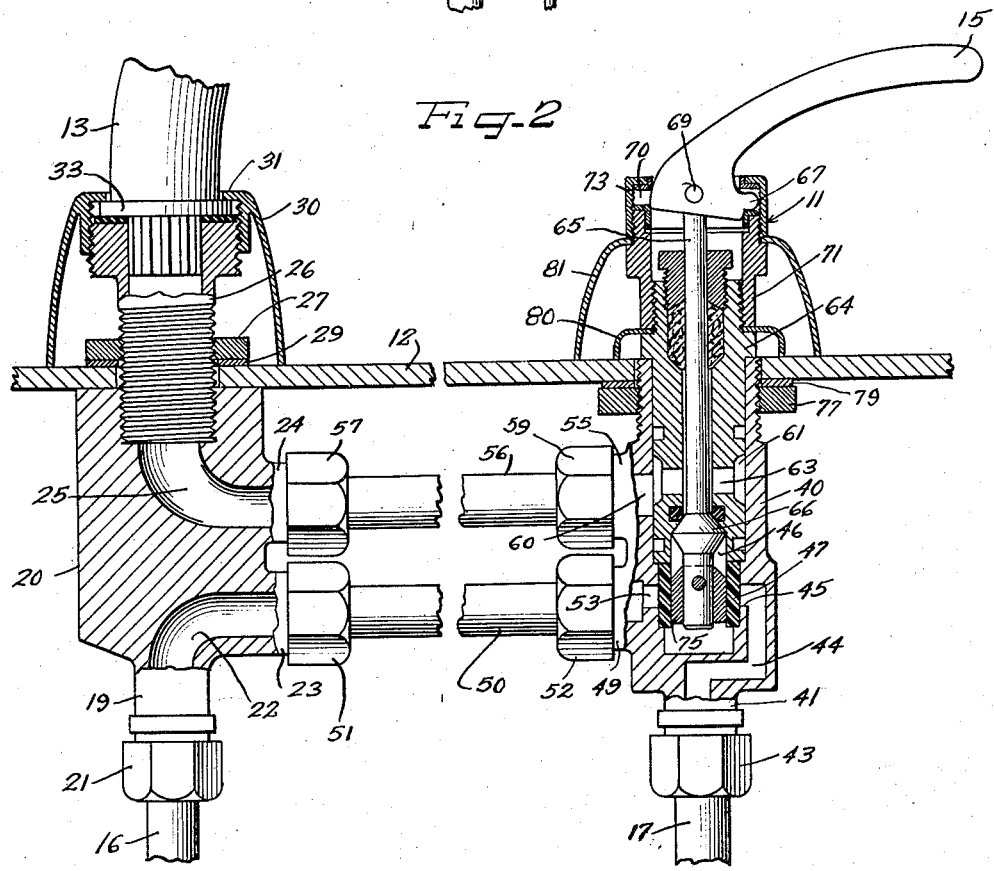
Inventor
Wilson B. Graham
by Hill, Sherman, Meroni, Gross & Simpson Attys.

United States Patent Office 2,878,489
Patented Mar. 24, 1959

2,878,489

MIXING FAUCET FITTING

Wilson B. Graham, Chicago, Ill.

Application February 27, 1958, Serial No. 717,866

6 Claims. (Cl. 4—192)

This invention relates to improvements in mixing faucets and more particularly relates to a faucet arrangement adapting a mixing faucet and individual spout to a double opening lavatory.

A principal object of the invention is to provide a simple and efficient fitting arrangement adapting a mixing faucet and spout to a double opening lavatory with no rearrangement of the piping to the lavatory.

A further object of the invention is to provide a mixing faucet body and fitting arrangement enabling a mixing faucet and spout to replace the two faucets of a double faucet lavatory with no rearrangement of the piping to the lavatory.

A still further object of the invention is to provide a faucet body and fitting arrangement for a double opening lavatory in which the body and fitting arrangement are beneath the deck of the lavatory for connection to the piping thereto to accommodate a single lever mixing faucet and single spout to replace the usual two faucets of the lavatory.

Still another object of the invention is to provide a novel and improved form of spout for a lavatory having a swan-neck curvature so arranged as to accommodate hooks for face cloths and the like to be supported thereon and to drip into the lavatory.

These and other objects of the invention will appear from time to time as the following specification proceeds and with reference to the accompanying drawing wherein:

Figure 1 is a perspective view of a double faucet lavatory in which a mixing faucet and spout replace the usual two faucets of the lavatory, and are connected to the usual hot and cold water pipes of the lavatory; and Figure 2 is a fragmentary sectional view taken through the faucet and spout and illustrating the fitting arrangement of the invention.

In the embodiment of the invention illustrated in the drawing, reference character 10 designates a lavatory of a type usually having individual hot and cold water faucets, in which one faucet is replaced by a mixing faucet 11 extending above a deck 12 of the lavatory and the other faucet is replaced by a spout 13 supplied with mixed, hot or cold water from the mixing faucet 11 upon operation of a handle 15 thereof. Hot and cold water lines 16 and 17, respectively, are shown as supplying water to the lavatory. These hot and cold water lines are the standard hot and cold water lines usually supplied to such lavatories, one supplying hot water to one faucet and the other supplying cold water to the other faucet.

Referring now in particular to the novel features of the invention in which the standard hot and cold water lines are utilized for supplying hot and cold water to the mixing faucet 11 which in turn supplies mixed or hot or cold water to the spout 13 without altering the hot and cold water lines 16 and 17, the hot water line 16 is shown as being connected to a depending hollow boss 19, depending from a spout fitting 20 disposed beneath the deck 12 of the lavatory. A coupling nut 21 is threaded on the boss 19 and serves to couple the pipe 16 thereto, and to seal said pipe to said boss to conduct hot water to a passageway 22 leading through said boss and opening through a boss 23, extending from the spout fitting 20 at right angles to the boss 19 toward the cold water pipe 17.

The spout fitting 20 also has a boss 24 extending parallel to the boss 23 and having a passageway 25 leading therethrough and opening upwardly, to afford communication with a coupling 26. The coupling 26 is threaded within the spout fitting 20 and extends upwardly therefrom through the deck and forms a coupling for the spout 13, which is suitably mounted therein and sealed thereto. The coupling 26 and spout fitting 20 are held in position by a spout lock nut 27 threaded on said coupling above the deck 12 and pressing a gasket 29 into engagement with the top of the deck 12, and retaining the coupling 26 and spout fitting 20 to the lavatory. A spout escutcheon 30 has an inwardly extending upper annular portion 31 extending over an annular shouldered portion 33 of the spout 13 to retain said spout in position on the spout fitting 26. Suitable gasket or sealing means may be provided to seal the spout 13 to the coupling 26.

The spout 13 is herein shown as being a high curved spout of a substantially swan-neck curvature positioning the discharge end of the spout to discharge water in the central portion of the lavatory. As herein shown, a hook 35 is mounted on the spout 13 adjacent the discharge end thereof, while a plurality of hooks 36 are mounted on the spout 13 inwardly of the discharge end thereof. The hooks 35 and 36 may be used for hanging wet washcloths thereon and are positioned by the curvature of the spout, to position the washcloths over the lavatory to drip thereinto.

While the hooks 35 and 36 may be formed integrally with the spout 13 they are herein shown as being formed integrally with collars 37 and 39 respectively, suitably mounted on the spout. The hooks 35 and 36 and their respective collars 37 and 39 may be made from metal, a plastic, or a like material.

The adapter for the faucet 11 is shown as comprising a faucet housing 40 to be substituted for the usual body for the faucet and having a hollow boss 41 depending therefrom and connected with the cold water line 17, by a packing or gland nut 43. A passageway 44 leads through the hollow boss 41 along the wall of the faucet housing 40 and opens to a semi-annular passageway 45 having communication with a mixing chamber 46 through a ported cage or seat 47 seated within the faucet housing 40.

The faucet housing 40 also has a hollow boss 49 facing the boss 23 of the spout fitting 20 and in axial alignment therewith. The bosses 23 and 49 are shown as being connected together to supply hot water to the faucet housing 40, by a pipe 50 connected to said bosses by coupling nuts 51 and 52. The hollow interior portion of the boss 49 has communication with a semi-annular passageway 53 having communication with the cage 47.

The faucet housing 40 likewise has a hollow boss 55 extending therefrom, parallel to the boss 49 and in axial alignment with the boss 24. The hollow boss 55 is connected in flow communication with the hollow boss 24 as by a pipe 56 connected to the bosses 24 and 55 at its opposite ends as by coupling nuts 57 and 59, respectively. The boss 55 has communication with a passageway 60 leading to the interior of the faucet housing 40 and having communication with an annular passageway 61, and cross drilled passageways 63 in a faucet body 64 within the housing 40.

The mixing faucet 11 may be of any well known form, and as herein shown, is of a form in which the handle 15 of the faucet pivotally moves a valve stem 65 about its axis to effect the delivery of hot, cold or tempered water into the mixing chamber 46, and in which upward movement of the handle 15 will move a valve 66 on the stem 65 into position to admit water from the mixing chamber 46 through the cross drilled passageways 63 to be delivered to the spout 13 through the pipe 56 and passageway 25 in the spout fitting 20. The faucet 11, therefore, need only be described in sufficient detail to make my present invention readily understandable.

The handle 15 is herein shown as having an ear 67 projecting from the base thereof and substantially in alignment with a pin 69 pivotally connecting said handle to the valve stem 65. The ear 67 reacts against the vertically spaced walls of an annular recess 70 formed between the upper end of a valve body nut 71 threaded on the upper end of the valve body 64 and a cap nut 73 threaded on the valve body nut 71 and terminating in vertically spaced relation with respect thereto.

The stem 65 has a piston 75 on the lower end thereof spaced beneath the valve 66. The piston 75 has upwardly opening ports therein (not shown) communicating with ports (not shown) in the cage 47. Movement of the piston 75 about the axis of the valve stem 65 will, therefore, admit the hot or cold water into the mixing chamber 46 or will admit varied amounts of hot and cold water into said mixing chamber dependent upon the position of the piston 75 with respect to the cage 47, as is usual with such valves, so not herein shown or described further.

The faucet 11 is secured in position to the deck 12 as by a lock nut 77 threaded on the faucet housing 40 beneath the deck 12 and abutting a gasket 79 and also drawing an inner hold-on ring 80 and an outer escutcheon 81 into engagement with the top of the deck, it being understood that the hold-on ring is mounted on the body 64 and is retained thereto by the valve body nut 71. The escutcheon 81 is also mounted on the valve body nut 71 and is retained thereto as by the cap nut 73.

It may be seen from the foregoing that by the substitution of the faucet housing 40 for the usual faucet housing having hot and cold water connections leading thereinto, and by the use of the spout fitting 20, that a two faucet lavatory may be adapted for a single mixing faucet and spaced spout with no changes in the hot and cold water piping leading to the lavatory and with a minimum amount of plumbing connections.

It may further be seen that I have provided a spout for the hot, cold or mixed water of a high curved swan-neck type, positioning the discharge end of the spout to discharge adjacent the center of the lavatory and also positioning hooks thereon for washcloths and the like in position to enable washcloths to be hung thereon and drip into the lavatory.

While I have herein shown and described one form in which my invention may be embodied, it should be understood that various modifications and variations of the invention may be effected without departing from the spirit and scope of the novel concepts thereof, as defined by the claims appended hereto.

I claim as my invention:

1. A fitting arrangement particularly adapting a piping system for a two faucet lavatory having a deck having spaced holes therein for hot and cold water faucets, to supply water at different temperatures to a mixing faucet and spaced spout, comprising a faucet housing adapted to be secured to a hole in the lavatory for one faucet, beneath the deck thereof, a spout fitting adapted to be secured to a hole in the lavatory for a second faucet beneath the deck thereof, inlets for water at different temperatures leading into said faucet housing and said fitting through the bottoms thereof in axial alignment with the supply pipes to the lavatory, and piping means supplying water from said spout fitting to said faucet housing and from said faucet housing to said spout fitting.

2. A fitting arrangement in accordance with claim 1 in which a mixing faucet body and valve means is mounted within said faucet housing and in which the piping means comprises parallel spaced pipes connecting fitting and said housing together, supplying water at one temperature to said housing and supplying hot, cold or mixed water to said spout fitting.

3. In a lavatory, a deck having spaced holes therein for hot and cold water faucets, piping means in axial alignment with the centers of said holes for supplying hot and cold water to the lavatory, the improvements comprising means adapting a mixing faucet and individual spout to said holes and piping means comprising housing means for said mixing faucet, fitting means for said spout, means securing said housing means and mixing faucet to one hole in said deck, means securing said spout means and spout to the other hole in said deck, inlets to said fitting means and housing means leading through the bottoms thereof in axial alignment with the hot and cold water lines leading to the lavatory, and means providing fluid connections between said fitting means and said housing means, to supply water at one temperature to said housing means through the wall thereof and to supply hot, cold or mixed water to said fitting means dependent upon the position of the mixing faucet.

4. A fitting system particularly adapting the piping of a two faucet lavatory to a single mixing faucet and spaced spout, comprising a faucet housing for a mixing faucet having an inlet leading thereinto in axial alignment with piping for water to the lavatory at one temperature, an inlet leading into a side wall of said housing for water at a different temperature, an outlet leading from said side wall parallel to said last mentioned inlet, a fitting for a spout and the like having an inlet leading thereinto in axial alignment with the piping for water at a different temperature from the first mentioned piping, an outlet leading laterally from the wall thereof in axial alignment with the inlet leading through the wall of said faucet housing, and an inlet into said spout fitting in axial alignment with the outlet through the wall of said faucet housing, accommodating the faucet housing and fitting to be connected directly to the hot and cold water lines leading to the lavatory and accommodating said faucet housing and fitting to be connected together to deliver hot and cold water to the faucet housing and to deliver hot, cold or tepid water to the spout housing dependent upon the on position of the mixing faucet.

5. In a fitting system particularly adapting a piping system for a two faucet lavatory to a mixing faucet and spaced spout, a faucet housing having a faucet body and valve means therein, means connecting said faucet housing and faucet to one faucet opening in a two faucet lavatory, a spout fitting, a spout adapted to be mounted therein, means securing said spout housing and spout to a second faucet opening of the lavatory, a downwardly opening inlet into said spout fitting for water at a first temperature in axial alignment with one pipe leading to said lavatory, a downwardly opening inlet into said faucet housing for water at a second temperature in axial alignment with a second pipe leading to said lavatory, said spout fitting having an outlet leading from the wall thereof, and an inlet leading into the wall thereof, and laterally extending vertically spaced inlets and outlets leading into and from said faucet housing in axial alignment with the outlets and inlets leading from and into said spout fitting and having fluid communication therewith.

6. In a fitting system particularly adapting a piping system for a two faucet lavatory to a mixing faucet and spaced spout, a faucet housing having a faucet body and valve means therein, means connecting said faucet housing and faucet to one faucet opening in a two faucet lavatory, a spout fitting, a spout adapted to be mounted therein, means securing said spout housing and spout to a second faucet opening of the lavatory, a downwardly opening inlet into said spout fitting for water at a first temperature in axial alignment with one pipe leading to said lavatory, a downwardly opening inlet into said faucet housing for water at a second temperature in axial alignment with a second pipe leading to said lavatory, said spout fitting having an outlet leading from the wall thereof, and an inlet leading into the wall thereof, and laterally extending vertically spaced inlets and outlets leading into and from said faucet housing in axial alignment with the outlets and inlets leading from and into said spout fitting, a pipe connecting said outlet from said spout fitting to the aligned inlet into said faucet housing, a second parallel pipe connected to said outlet from said faucet housing to said inlet to said fitting, said mixing valve means within said faucet housing controlling the flow of hot, cold or tempered water through the outlet thereof.

References Cited in the file of this patent

UNITED STATES PATENTS

| | | |
|---|---|---|
| 1,212,806 | Newton | Jan. 16, 1917 |
| 1,827,575 | Gemmershausen | Oct. 13, 1931 |
| 2,091,110 | Smallen | Aug. 24, 1934 |
| 2,465,814 | O'Brien | Mar. 29, 1949 |